S. SCHOENBROON.
ELECTRIC STEAM GENERATOR.
APPLICATION FILED JAN. 4, 1912.
1,028,912.
Patented June 11, 1912.
2 SHEETS—SHEET 1.
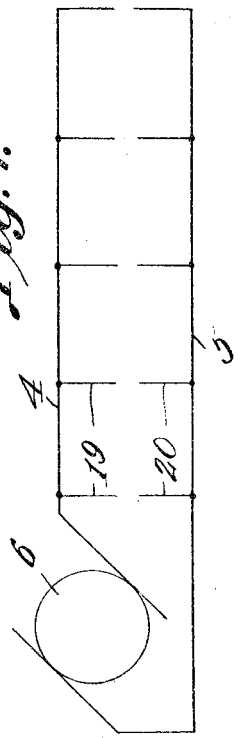
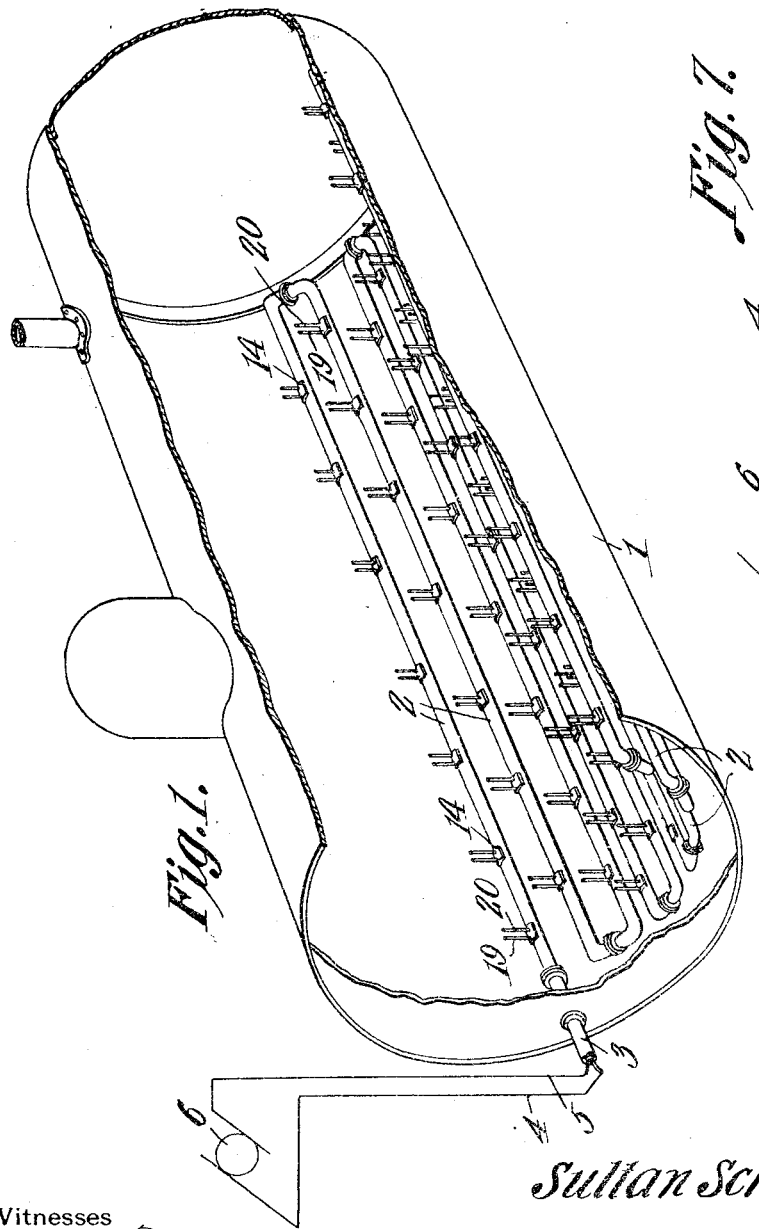
Sultan Schoenbroon
Inventor S. SCHOENBROON.
ELECTRIC STEAM GENERATOR.
APPLICATION FILED JAN. 4, 1912.
1,028,912.
Patented June 11, 1912.
2 SHEETS—SHEET 2.
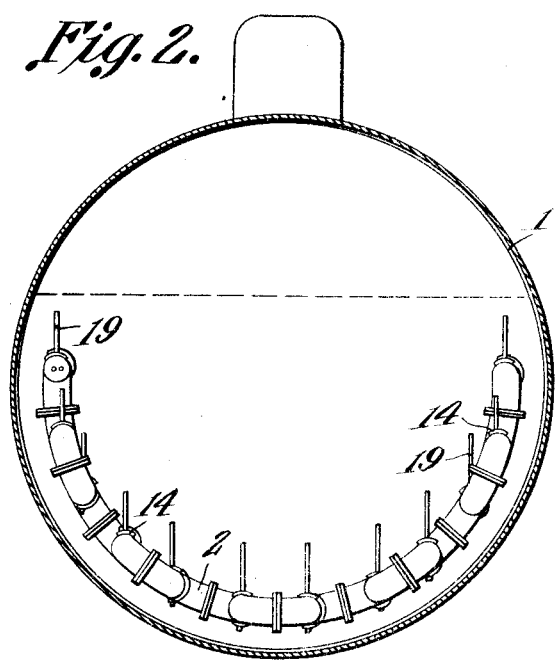
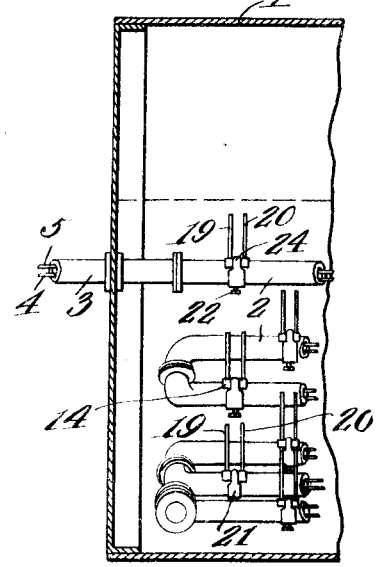
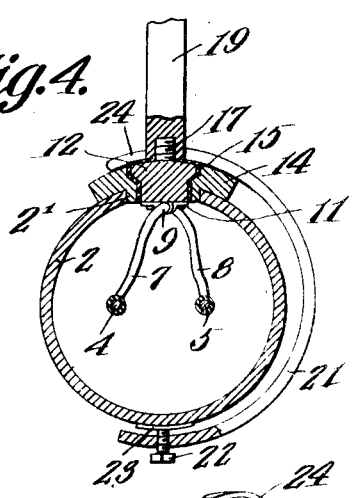
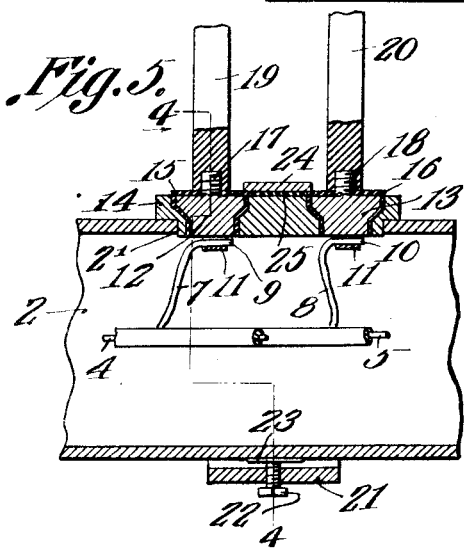
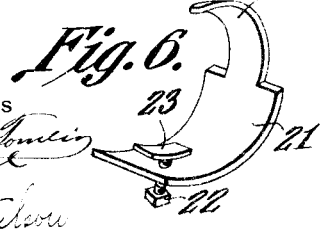
Sultan Schoenbroon,
Inventor
by C. A. Snow & Co.
Attorneys
Witnesses

# UNITED STATES PATENT OFFICE.

SULTAN SCHOENBROON, OF PITTSBURGH, PENNSYLVANIA.

ELECTRIC STEAM-GENERATOR.

1,028,912.     Specification of Letters Patent.     Patented June 11, 1912.

Application filed January 4, 1912. Serial No. 669,349.

*To all whom it may concern:*

Be it known that I, SULTAN SCHOENBROON, a citizen of the United States, residing at Pittsburgh, in the county of Allegheny and State of Pennsylvania, have invented a new and useful Electric Steam-Generator, of which the following is a specification.

The present invention relates to improvements in electric steam generators, the primary object of the invention being the provision of a boiler or tank for containing water and steam generated therefrom, in combination with a conduit mounted within the same and normally submerged within the water, said conduit being hermetically sealed so that the conductor wires carried therein and led from any source of electrical energy will not be brought in contact with the water, there being a plurality of pairs of spaced electrodes carried in spaced relation throughout the length of the conduit, said electrodes projecting into the water and connected in parallel to the conductors within the conduit.

A further object of the present invention is a novel form of electrode carrying plug held tightly within apertures formed within the wall of the conduit, so as to permit the ready removal and renewal of the electrodes, and at the same time form a tight seal to prevent the leakage of the water into the conduit.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings Figure 1 is a perspective view of a generator, a portion of the same being broken away to show the disposition of the heating element therewithin. Fig. 2 is a cross section through the end of the boiler showing the heating element in end elevation. Fig. 3 is a longitudinal section of the forward portion of the boiler with portions of the heating element in elevation. Fig. 4 is a cross section taken on line 4—4 of Fig. 5. Fig. 5 is a longitudinal section through the conduit and electrode carrying plug. Fig. 6 is a perspective view of one of the plug retaining clamps. Fig. 7 is a diagram of the electrical circuit.

Referring to the drawings, the numeral 1 designates the boiler tank which has disposed therein and supported in any desired manner, the coiled conduit 2 which projects exteriorly of the boiler as at 3 and provides a hermetical conduit for the reception and retention of the conductors 4 and 5 which receive their current from any source 6 of electrical energy.

Branched off from the respective conductors 4 and 5 at desired intervals throughout the length of the conduit 2 are the branch conductors 7 and 8, respectively, which are provided with the bare terminals 9 and 10, respectively. to fit within the clamps 11 carried by the respective terminal carrying plugs 12 and 13 respectively. These terminals are insulated from the main plug 14, which is fitted snugly within the apertures 2' of the conduit 2, by means of the bushings 15 and 16, respectively, of insulation. Each one of the respective plugs 12 and 13 is provided with the threaded stems 17 and 18 respectively, to which are removably attached the electrodes 19 and 20 respectively. These electrodes are preferably made of carbon, though any other material may be used that will produce the desired gap to be closed by the intervening water, so that the current of electricity supplied from the parallel conductors 4 and 5 will pass from the electrode, as for instance 19, through the intervening water to the electrode 20, thus producing sufficient heat to cause the generation of the steam.

In order to retain the electrode carrying plug 14 tightly within the apertures 2' of the conduit 2, so that there can be no leakage of the water into the conduit, a retaining clip or clamp such as shown in Fig. 6 is preferably employed. This consists of a curved body of a slightly greater length than half of the circumference of the conduit and provided with the broad portion 21, carrying the adjusting screw 22 and clamp plate 23, and the reduced terminal 24. When in position the reduced terminal 24 rests upon the strip 25 of insulation between the respective plugs 12 and 13, while the body portion extends partially around the conduit, so that the clamping plate 23 will engage the conduit at a point diametrically opposite to the longitudinal center line of the plug 14.

By the construction of terminal plugs and electrodes, it is readily apparent that the same may be quickly removed and replaced, and that without affecting the interior portions of the main carrying plug 14 and the electrical connections with the plugs 12 and 13.

What is claimed is:

1. An electric steam generator, having a water reservoir, a conduit within the reservoir and hermetically sealed therewithin, an electrical source of energy, a circuit leading therefrom, the conductors of which are mounted within said conduit, said conduit being provided with a plurality of apertures in spaced relation throughout the length thereof, and a plug carrying a pair of electrodes mounted in each aperture and connected to the conductors.

2. An electric steam generator, having a water reservoir, a conduit within the reservoir and hermetically sealed therewithin, an electrical source of energy, a circuit leading therefrom, the conductors of which are mounted within said conduit, said conduit being provided with a plurality of apertures in spaced relation throughout the length thereof, a plug sealing each aperture, and a pair of electrodes connected to and carried by the plug and connected to the conductors within the conduit.

3. An electric steam generator, having a water reservoir, a conduit within the reservoir, an electrical source of energy, a circuit leading therefrom and having the conductors thereof mounted within the conduit and protected from the water by the conduit, said conduit being provided with a plurality of apertures, a plug hermetically sealing each aperture, and two electrode carrying plugs mounted in each sealing plug and electrically connected to the conductors within the conduit.

4. An electric steam generator, having a water reservoir, a conduit within the reservoir, an electrical source of energy, a circuit leading therefrom and having the conductors thereof mounted within the conduit and protected from the water by the conduit, said conduit being provided with a plurality of apertures, a plug hermetically sealing each aperture, and two electrode carrying plugs mounted in each sealing plug and electrically connected in parallel to the conductors within the conduit.

5. An electric steam generator, having a water reservoir, a conduit within the reservoir, an electrical source of energy, a circuit leading therefrom having the conductors thereof mounted within the conduit, said conduit being provided with a plurality of apertures, a plug hermetically sealing each aperture, two electrode carrying plugs mounted in each sealing plug and insulated therefrom, the inner ends of said plug being connected to the respective conductors within the conduit, and an electrode terminal carried by each of the electrode carrying plugs.

6. An electric steam generator, having a water reservoir, a conduit within the reservoir, an electrical source of energy, a circuit leading therefrom having the conductors thereof mounted within the conduit, said conduit being provided with a plurality of apertures, a plug hermetically sealing each aperture, two electrode carrying plugs mounted in each sealing plug and insulated therefrom, the inner ends of said plugs being connected to the respective conductors within the conduit, and an electrode removably carried by each of the electrode carrying plugs.

7. An electric steam generator, having a water reservoir, a conduit within the reservoir, an electrical source of energy, a circuit leading therefrom and having the conductors thereof mounted within the conduit and protected from the water by the conduit, said conduit being provided with a plurality of apertures, a plug hermetically sealing each aperture, a retaining means for the plug engaging the plug and the conduit, and two electrode carrying plugs mounted in and insulated from each sealing plug, and having their inner ends connected to the conductors.

In testimony that I claim the foregoing as my own, I have hereto affixed my signature in the presence of two witnesses.

SULTAN SCHOENBROON.

Witnesses:
SELMA WILLSON,
W. H. C. CLARKE.